United States Patent [19]
Meguro

[11] Patent Number: 5,381,658
[45] Date of Patent: Jan. 17, 1995

[54] DIAGNOSTIC APPARATUS FOR USE IN AN EXHAUST SYSTEM OF AN INTERNAL COMBUSTION ENGINE

[75] Inventor: Taiichi Meguro, Okazaki, Japan

[73] Assignee: Toyota Jidosha Kabushiki Kaisha, Toyota, Japan

[21] Appl. No.: 146,551

[22] Filed: Nov. 2, 1993

[30] Foreign Application Priority Data

Nov. 13, 1992 [JP] Japan .................. 4-304197

[51] Int. Cl.⁶ .............................................. F01N 3/22
[52] U.S. Cl. ........................................ 60/276; 60/277; 60/289; 60/290
[58] Field of Search ................. 60/276, 277, 289, 290

[56] References Cited

U.S. PATENT DOCUMENTS

| | | | |
|---|---|---|---|
| 4,231,220 | 11/1980 | Takeda | 60/289 |
| 5,060,474 | 10/1991 | Aramaki | 60/277 |
| 5,113,651 | 5/1992 | Kotzan | 60/277 |
| 5,119,631 | 6/1992 | Kayanuma | 60/289 |
| 5,140,810 | 8/1992 | Kuroda | 60/290 |

FOREIGN PATENT DOCUMENTS 63212750 9/1988 Japan .
6453046 3/1989 Japan .
4308312 10/1992 Japan .
4311646 11/1992 Japan .

Primary Examiner—Douglas Hart
Attorney, Agent, or Firm—Kenyon & Kenyon

[57] ABSTRACT

A diagnostic apparatus for use in an exhaust system of an internal combustion engine is disclosed. The system has a catalyst for purifying the exhaust gas in the exhaust gas passage and an oxygen sensor for detecting an air-fuel ratio in a combustion chamber, wherein fuel injection volume is controlled for optimizing the air-fuel ratio and the catalyst activation when the engine is operated under normal conditions, and wherein secondary air is supplied to the exhaust gas passage from a secondary air supply mechanism for forcibly adjusting the air-fuel ratio when the engine is operating under extreme conditions. The apparatus has a computing device which computes an actual volume of the secondary air supplied to the exhaust gas passage from the secondary air supply mechanism. The apparatus further has a storing device which stores data indicative of malfuncting secondary air supply mechanism members corresponding to the computed volume supplied to the exhausted gas passage, and a determining device for determining the malfunctioning member in accordance with the value detected by the oxygen sensor and the stored data corresponding the detected value.

21 Claims, 4 Drawing Sheets

DIAGNOSTIC APPARATUS FOR USE IN AN EXHAUST SYSTEM OF AN INTERNAL COMBUSTION ENGINE

BACKGROUND OF THE INVENTION

The present invention relates generally to a diagnostic apparatus for use in a secondary air supply mechanism which supplies secondary air to an exhaust gas passage of an internal combustion engine. More specifically, the present invention relates to a malfunction diagnosing apparatus for use in a secondary air supply mechanism of having a purification system including a three way catalyst and an oxygen sensor for purifying the exhaust gas.

DESCRIPTION OF THE RELATED ART

Generally, an internal combustion engine combines air flowing through an intake air passage with fuel injected from fuel injection valves to form an air/fuel mixture. After combustion, the exhaust gas is discharged through a discharge passage. The exhaust gas includes toxic carbon monoxide (CO), hydrocarbon (HC), nitrogen oxides (Nox), etc. These elements are a major cause of air pollution. Environmental pollution laws for restricting exhaust gas emission are strictly enforced. These same environmental control laws require internal combustion engines to provide an increasing fuel economy rate.

The present invention accomplishes the above by a method which purifies the exhaust gas by utilizing a three way catalyst and an oxygen sensor employed to simultaneously achieve the foregoing exhaust gas control and reduction of fuel economy rate. Through this method, oxidation of carbon monoxide and hydrocarbons, and reduction of nitrogen oxides in the exhaust gas are simultaneously carried out. The three way catalyst can most efficiently purify those three elements, when the air-fuel ratio of the mixture (i.e., the ratio of air and fuel) approximates a predetermined theoretical air-fuel ratio. The theoretical air-fuel ratio contains the required volume of oxygen to completely burn the fuel.

To converge the air-fuel ratio to the theoretical air-fuel ratio, conventionally, while the engine is running normally, the oxygen sensor detects concentrations of oxygen in the exhaust gas, and transmits a detected signal (i.e., output voltage) to a computer. The fuel injection valves are controlled to adjust the fuel volume injected therethrough. The present invention includes feedback control for this air-fuel ratio which will be further described in detail. The computer determines whether or not the actual air-fuel ratio is rich or lean with respect to the theoretical air-fuel ratio, by comparing the output voltage from the oxygen sensor with the preset value (i.e., reference voltage). Further, the computer monitors and controls the injected fuel volume within the closed feedback loop, so as insure that the actual air-fuel ratio falls within a predetermined narrow range of the theoretical air-fuel ratio.

However, under the condition when the coolant temperature is low (i.e., warm-up condition) just after starting the internal combustion engine, or when the engine is running under a heavy load applied thereon, the air-fuel ratio is controlled with an open feedback loop operation. During the warming-up period, the air-fuel ratio forcibly becomes the lean condition by supplying the secondary air to the exhaust discharge passage due to the function of a secondary air supply mechanism. The air-fuel ratio at this time is controlled to improve the purification efficiency (i.e., warm-up efficiency) of the three way catalyst. Under conditions of applied heavy loads, the secondary air supply is suspended and the air-fuel ratio is forced into the rich condition by increasing the fuel injection volume to the engine. Decreasing the air-fuel ratio at this time is carried out to prevent the three way catalyst from lowering its purification ability due to over heating.

Accordingly, both the warm-up operation or the operation under a heavy load of the engine is carried out by forcibly supplying or suspending the secondary air. Therefore, if a malfunction or breakdown occurs in the secondary air supply mechanism, the warm-up operation or the operation under a heavy load can not be carried out. Therefore, it is very important to detect irregular conditions in the secondary air supply mechanism.

Japanese Unexamined Patent Publication No. 63-212750 discloses an apparatus for detecting an irregular condition in the air supply mechanism. In this technology, when the fuel injection volume is increased due to the high speed operation of the engine, the air-fuel ratio of the mixture will be detected. If the supply mechanism for the secondary air is defective, i.e., if the secondary air is not supplied, the air-fuel ratio should be enriched due to the increased fuel supply. However, if the secondary air is introduced to the engine, the air-fuel condition will become the lean condition. Therefore, where the lean condition of the air-fuel ratio continuously exists over the fixed period of time during the increment of fuel supply, the cause for this condition is determined to be to the irregular condition in the air supply mechanism.

Various multiple causes must be considered for the irregular conditions in the supply mechanism. For example, a malfunction in the supply system which forcibly supplies the air to the exhaust discharge passage, may be due to one or all of: a breakdown of the air pump itself, a malfunction in the controller for the air pump, a clog in the secondary air passage, a leakage in the discharge passage and other causes known and unknown. Some correlation between these causes and the magnitudes of the irregular conditions in the supply mechanism can be considered. More specifically, the deviation between the known volume of the secondary air when the supply mechanism is properly operating and the actual volume of the secondary air is computed. The computed deviation is considered as the magnitude of the irregular condition. Through experiments, it is known that the deviation is the maximum when the air pump itself is not functioning due to breakdown or a faulty controller. Further, the deviation is the minimum when the leakage occurs in the exhaust passage. The deviation is moderate when foreign matter clogs the supply passage.

Therefore, when the diagnostic operation for detecting the irregular conditions in the supply mechanism is accomplished, the cause for the irregular condition can be determined if the magnitude of the irregular condition is detected. Then, when the repair work is completed the detected irregular condition is reduced or eliminated. Accordingly, the diagnostic operation shortens repair work and improves efficiency.

SUMMARY OF THE INVENTION

Accordingly, it is a primary objective of the present invention to overcome the foregoing problems and provide an irregular condition diagnostic apparatus for the secondary air supply which can detect the magnitude of the irregular condition in the secondary air supply mechanism and further can diagnose the irregular section thereof.

For achieving an above object, according to the present invention a diagnostic apparatus for use in an exhaust system of an internal combustion engine is provided. The daignostic apparatus has a catalyst for purifying the exhaust gas in the exhaust gas passage and an oxygen sensor for detecting an air-fuel ratio in a combustion chamber, wherein fuel injection volume is controlled for optimizing the air-fuel ratio and the catalyst activation when the engine is operated under normal conditions, and wherein secondary air is supplied to the exhaust gas passage from a secondary air supply mechanism for forcibly adjusting the air-fuel ratio when the engine is operating under extreme conditions. The apparatus further has means for computing an actual volume of the secondary air supplied to the exhaust gas passage from the secondary air supply mechanism, means for storing data indicative of malfunctioning secondary air supply mechanism members corresponding to the computed volume supplied to the exhausted gas passage, and means for determining the malfunctioning member in accordance with the value detected by the oxygen sensor and the stored data corresponding thereto.

BRIEF DESCRIPTION OF THE DRAWINGS

The features of the present invention that are believed to be novel are set forth with particularity in the appended claims. The invention, together with objects and advantages thereof, may be better understood by reference to the following description of the presently preferred embodiments together with the accompanying drawings, in which:

DETAILED DESCRIPTION OF THE PREFERRED EMBODIMENT

A preferred embodiment according to the present invention will now be described by reference to FIGS. 1 through 4.

Figure 1:
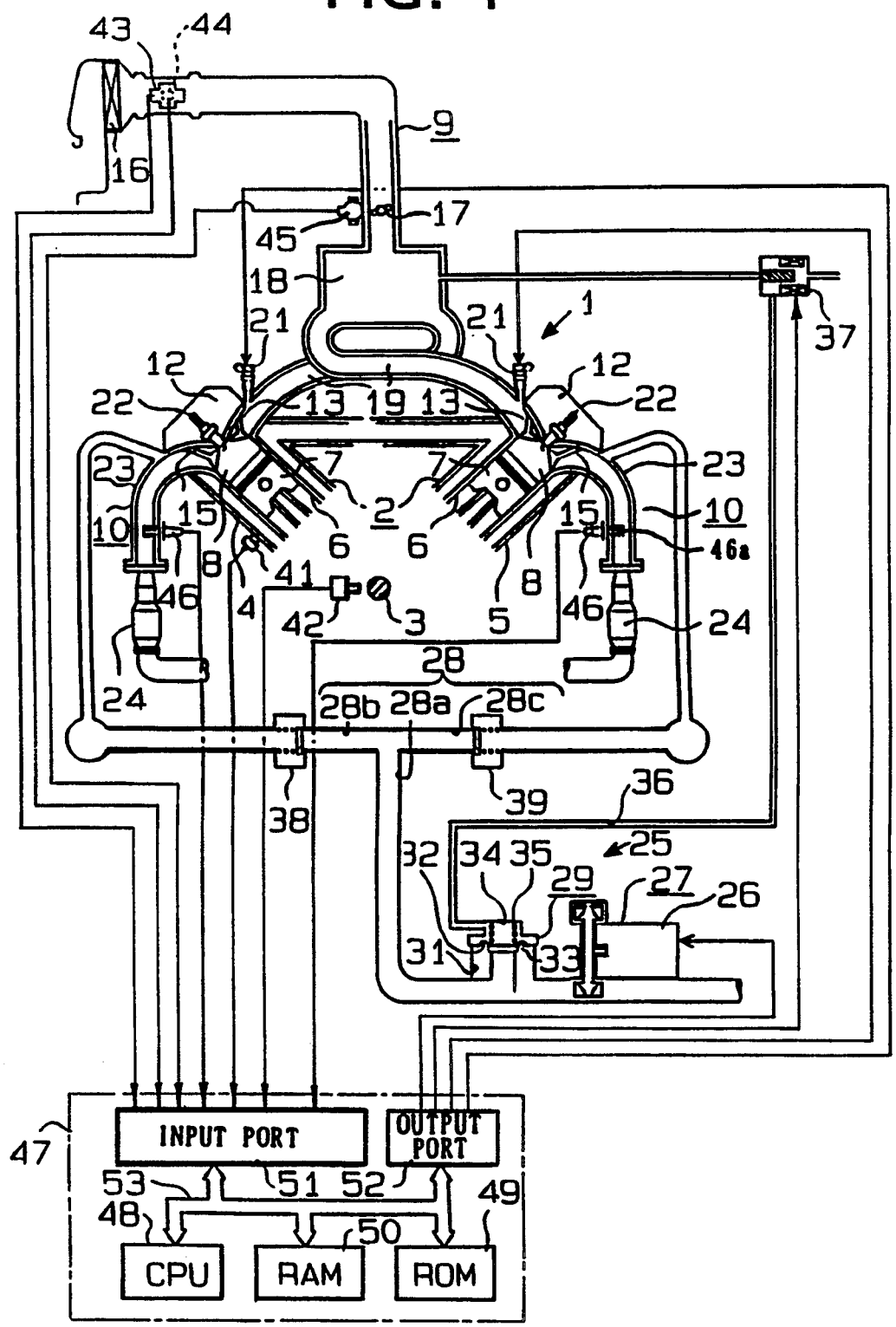
FIG. 1 is a block diagram showing an irregular condition diagnostic apparatus for use in a secondary air supply mechanism according to then present invention.

Referring now to FIG. 1, there is shown a V type engine 1 adapted for mounting on a vehicle. The engine 1 includes a crank shaft 3 which extends inward along the perpendicular direction with respect to the surface shown of FIG. 1. A cylinder block 2 of the engine 1 is separated into two banks 4, 5, which extend to the left and right directions respectively in FIG. 1 to form the V shape with respect to the crank shaft 3.

Each of the banks 4, 5 includes a plurality of cylinder bores 6, respectively (only one cylinder bore/bank is shown in FIG. 1). In each of the banks 4, 5, the cylinder bores 6 are disposed in parallel along the direction of the crank shaft 3. Pistons 7 are reciprocally movably accommodated in the associated cylinder bores 6. Further, the pistons 7 are operably connected to the crank shaft 3 by means of connecting rods 11. The connecting rods 11 and crank shaft 3 operably cooperate to convert reciprocal motion of the pistons 7 into rotational motion.

In each of the cylinder bores 6, combustion chambers 8 are located above and are defined by the pistons 7. An air intake passage 9 and exhaust discharge passage 10 are in fluid communication with each combustion chamber 8. The communicating portion between the chamber 8 and intake passage 9 is opened by means of an intake valve 13 which is reciprocally movably arranged in a cylinder head 12. The communicating portion between the chamber 8 and discharge passage 10 is opened by means of an exhaust valve 15 which is arranged in the cylinder head 12.

The intake passage 9 includes an air cleaner 16, throttle valve 17, surge tank 18, and an intake manifold 19. These parts 16 through 19 are sequentially arranged from the air intake to the delivery side along the intake passage 9. Air sequentially passes through those parts in the intake passage 9, and is supplied to each chamber 8 when the intake valve 13 of the associated chamber 8 is opened. The throttle valve 17 is for adjusting throughput of air flowing through the passage 9. Further, the opening angle of the throttle valve 17 is controlled by manipulation of an accelerator pedal (not shown) disposed for operation from a drive's seat. A surge tank 18 is for smoothing out pulsations which are generated when the air is passing through the passage 9.

The engine 1 includes a plurality of fuel injection valves 21. The number of the injection valves 21 corresponds to the respective combustion chambers 8. These injection valves 21 are arranged in intake manifold 19, and inject fuel to each of the combustion chambers 8. The fuel injected from each of the injection valves 21 is mixed with the air flowing in intake passage 9. The mixture of this fuel and air is introduced to each of the combustion chambers 8. Ignition spark plugs 22 arranged in the cylinder heads 12 ignite the mixture in the combustion chambers 8, respectively. Explosive burning of this mixture in the combustion chamber 8 generates pressure. The generated pressure makes the piston 7 reciprocally move. This reciprocally motion of the piston 7 is transferred to the crank shaft 3 by means of the connecting rod 11. The transferred motion drives the shaft 3 to rotate. Exhaust gas generated by burning is discharged to the exhaust discharge passage 10 when the exhaust discharge valve 15 is opened.

Each of the exhaust discharge passages 10 includes an exhaust discharge manifold 23, three way catalytic converter 24 and muffler (not shown). These parts 23, 24 are sequentially arranged along the discharge passage 10 from the upper side to the downstream side thereof. The exhaust gas from each combustion chambers 8 sequentially passes through these parts 23, 24 in the passage 10, and is discharged to the outside. The catalytic converter 24 is an apparatus for purifying carbon monoxide (CO), hydrocarbon (HC), nitrogen oxides (NoI) in the exhaust gas by reaction of the catalyst.

Incidentally, the muffler, etc., acts as a throttle valve, such that it can be a resistance to the flowing exhaust gas. Because of this resistance, the pressure in the exhaust passage 10, especially in the exhaust discharge manifold 23 increases, based on and a result of the upward motion of the piston 7. As this pressure increases, exhaust pressure is generated by the throttle resistance of the exhaust discharge valve 15 and the flow resistance in the exhaust passage system.

A secondary air supply mechanism 25 for supplying the secondary air to the exhaust passage 10 against the exhaust pressure will now be described. This mechanism 25 includes an air pump 27 which is driven by a motor 26 which may be electric or mechanically energized. The air pump 27 is connected to both left and right discharge passages 10, via a secondary air supply passage 28. More specifically, the supply passage 28 includes a combined portion 28a which is connected to a discharge port of the air pump 28, and a pair of branched portions 28b, 28c which are branched away from the combined portion 28a. Both branched portions 28b, 28c are connected to the exhaust discharge manifolds 23, respectively. Therefore, the air compressed by the air pump 27 is supplied to the upperstream inlet of each converter 24 as the secondary air through the combined portion 28a and either one of the branched portions 28b or 28c.

In the combined portion 28a, an air switching valve (hereinafter referred to as ASV) 29 for opening or closing the supply passage 28 is disposed at the down stream side below the air pump 27. The ASV 29 includes a case 31, diaphragm 32, valve 33 and spring 35, etc. The valve body 33 covers an opening port 30 which is disposed midway along the combined portion 28a. The diaphragm 32 is disposed within the case 31, and yields according to the difference in the pressures applied at both sides thereof. The valve body 33 is secured to the central portion of the diaphragm 32. The valve body 33 displaces its position according to the yield of the diaphragm 32, and opens or shuts off the opening port 30. The inside of the case 31 is parted into two spaces by the diaphragm 32 and valve 33. One of the parted spaces is defined as a diaphragm chamber 34. The spring 35 is compressed and disposed in the diaphragm chamber 34, such that the spring 35 urges the valve body 33 toward the direction for shutting off the opening port 30 (downward in FIG. 1).

The diaphragm chamber 34 communicates with the surge tank 18 through a negative pressure or vacuum passage 36. This passage 36 is for introducing the negative pressure or vacuum generated in the intake passage 9 when the engine is running, to the diaphragm chamber 34. A vacuum switching valve (hereinafter referred to as VSV) 37 is disposed midway along the vacuum passage 36. The VSV 37 enables or disables the introduction of negative pressure to the diaphragm chamber 34. More specifically, when the VSV 37 is energized by applying electricity thereto, the VSV releases or opens the passage 36. By opening the passage 36, the introduction of negative pressure or vacuum to the diaphragm chamber 34 is enabled. Accordingly, the diaphragm 32 yields against the biasing force of the spring 35, such that the valve body 33 is displaced to open the opening port 30. As a result, supply of the secondary air to the exhaust discharge passage 10 is enabled. When the VSV 37 is not energized, the VSV 37 shuts off the passage 36. The introduction of the negative pressure to the diaphragm chamber 34 is disabled by shutting off the passage 36 wherein the diaphragm 34 is opened to the atmospheric pressure. The diaphragm 32 then returns to the original position by the biasing force of the spring 35, such that the opening port 30 is shut off due to the displacement of the valve body 33. As a result, the supply of the secondary air to the discharge passage 10 is disabled.

Check valves 38, 39 are disposed midway along the branched passages 28b, 28c, respectively. Both check valves 38, 39 prevent the exhaust gas originated in the exhaust pulsations from combustion chambers 8 from reverse or backflow from the left and right exhaust manifolds 23 to each of the branched portions 28b, 28c The engine 1 includes a coolant sensor 41, engine speed sensor 42, air flow meter 43, intake air temperature sensor 44, throttle sensor 45 and oxygen sensor 46 with heater 46a for detecting the engine running condition. The coolant sensor 41 is disposed in the cylinder block 2 for detecting the temperature of coolant (hereinafter referred to as THW) which is flowing in the engine 1. The engine speed sensor 42 detects the number of revolutions per unit time of the drive shaft 3, i.e., the engine speed (NE).

The air flow meter 43 is disposed at the lower stream of the air cleaner 16 in the intake passage 9, and detects the throughput (intake air volume $Q_{AFM}$) of air supplied to the intake passage 9 and thereafter to combustion chambers 8. The intake air temperature sensor 44 is disposed within the air flow meter 43, and detects the temperature (hereinafter referred to as THA) of the air flowing in the intake passage 9. The throttle sensor 45 is disposed in the vicinity of the throttle valve 17, and detects an opening angle (hereinafter referred to as TA) of the throttle valve 17.

The oxygen sensor 46 is disposed at the much lower stream side with respect to the location where the supply passage 28 is connected in each of the left and right exhaust discharge manifolds 23. The oxygen sensor 46 detects the oxygen concentration in the exhaust gas. The oxygen sensor 46 is formed with a zirconia element coated with platinum, and outputs the voltage according to the detected oxygen concentration. The output voltage V rapidly changes in the vicinity of the preset theoretical air-fuel ratio of 14.5.

The reasons for employing the oxygen sensor 46 with the heater 46a are as follows: Conventionally employed oxygen sensors generally have a characteristic of low electromotive force when the sensors are cold. If this is employed in this embodiment, in the region where the secondary air is supplied to the discharge passage 10, that is, specially in the region where the THW is low, the oxygen sensors become unstable. Therefore, even in the above-described region, the oxygen sensor is kept warm by the function of the heater 46a, such that the heated sensor can accurately detect the oxygen concentration. Then accurate detection for irregular conditions in the supply mechanism 25 can be achieved.

An input side of an electronic control unit (hereinafter referred to as ECU) 47 connects with the above described sensors 41 through 46 and air flow meter 43. An output side of the ECU 47 connects with injection valve 21, air pump 27 and VSV 37.

The ECU 47 includes a central processing unit (hereinafter referred to as CPU) 48 which may be for example a microprocessor, read only memory (hereinafter referred to as ROM) 49, random access memory (hereinafter referred to as RAM) 50, input port 51 and output port 52. These above-described parts are mutually connected through a bus 53. The CPU 48 carries out various operational processes according to pre-stored control programs. The ROM 49 stores the control programs and initial data which are required for the CPU 48 to carry out the operational processes beforehand. The RAM 50 temporarily stores operational results of the CPU 48.

The input port 51 inputs detected signals from the sensors 41 through 46, respectively. The CPU 48 detects the THW, NE, $Q_{AFM}$, THA, TA and oxygen concentration according to the input signals. The CPU 48 operably controls the injection valves 21, air pump 27 and VSV 37 through the output port 52 according to these detected signals.

More specifically, the CPU 48 computes the basic injection duration according to the $Q_{AFM}$ and the NE. The CPU 48 corrects the basic injection duration according to the signals sent from each of the sensors. Through the correction, the final injection duration of which the engine 1 requires is computed. In other words, the final injection duration TAU can be expressed as follows:

$$TAU = TP \times f \qquad (1)$$

where TP is the basic injection duration, and f is the correction coefficient.

The correction coefficient factor f is computed through the summation or product of the various coefficients. The various coefficients include intake air temperature, warm-up enrichment, starting enrichment, power enrichment and feedback control of the air-fuel ratio, etc. The coefficient factor relating to the intake air temperature is for correcting the divergence in the air-fuel ratio which is originated in the difference in the density of the intake air based on the intake air temperature, and is computed according to the THA. The coefficient factor relating to the warm-up enrichment is for increasing the basic injection volume in order to improve the driving ability, which is computed based upon the THW. The coefficient factor relating to the starting enrichment is for stabilize the NE just after the engine initiation, which is computed based upon the THW.

The coefficient factor relating to the power enrichment is for increasing the basic injection volume in order to balance good burning conditions in the engine 1 as well as the converter 24. Through this increment, the driving ability is improved even when the engine 1 is operating under a heavy load, and the increase in the catalyst temperature is controlled. The coefficient factor relating to the power enrichment is computed based upon the $Q_{AFM}$, NE and TA.

The coefficient factor relating to the feedback control of the air-fuel ratio is for correcting the basic injection volume such that the air-fuel ratio of the mixture converges to the theoretical air-fuel ratio. Therefore, the CPU 48 determines whether the air-fuel ratio is richer or leaner than the theoretical air-fuel ratio according to the signal sent from the oxygen sensor 46. More specifically, the CPU 48 compares the preset basic voltage with the output voltage V out of the sensor 46. If the CPU 48 determines the air-fuel ratio is enriched with fuel when the output voltage V is higher than the reference voltage, the CPU 48 reduces the coefficient factor to shorten the basic injection duration in order to converge to the theoretical air-fuel ratio. If the CPU 48 determines the air-fuel ratio is in the lean condition, the CPU 48 increases the coefficient factor to extend the basic injection duration in order to converge to the theoretical air-fuel ratio. When the air-fuel ratio converges to the theoretical air-fuel ratio, the coefficient factor corresponding to the theoretical factor becomes "1". In this way, the coefficient factor varies around the value "1" which corresponds to the theoretical air-fuel ratio.

When the CPU 48 computes the final injection duration TAU according to equation (1), the CPU 48 outputs the drive signal corresponding to the computed value to the injection valves 21 through the output port 52. The opening duration of the injection valves 21 is controlled such that a predetermined volume of fuel is injected through the injection valves 21 proportional to the signal.

Further, when the coolant sensor 41 detects that the THW is below the preset value at the engine 1 activation, the CPU 48 outputs a drive signal for operating the air pump 27 to satisfy the requirement of the exhaust gas characteristic. The air pump 27 operates according to this signal so as to discharge the secondary air to the supply passage 28. Under similar conditions, the CPU 48 outputs a drive signal in order to open the vacuum introduce passage 36 by operating the VSV 37. As the current is applied to the VSV 37 according to the signal, the VSV 37 opens the passage 36. As the negative pressure is introduced to the diaphragm chamber 34 through the opening of the passage 36, the opening port 30 is opened. Accordingly, the secondary air discharged from the air pump 27 is supplied to each of the discharge passages 10 through the supply passage 28.

The operations and effectiveness of the invention according to this embodiment which is constituted with the above-described manner will now be described.

Figure 2:
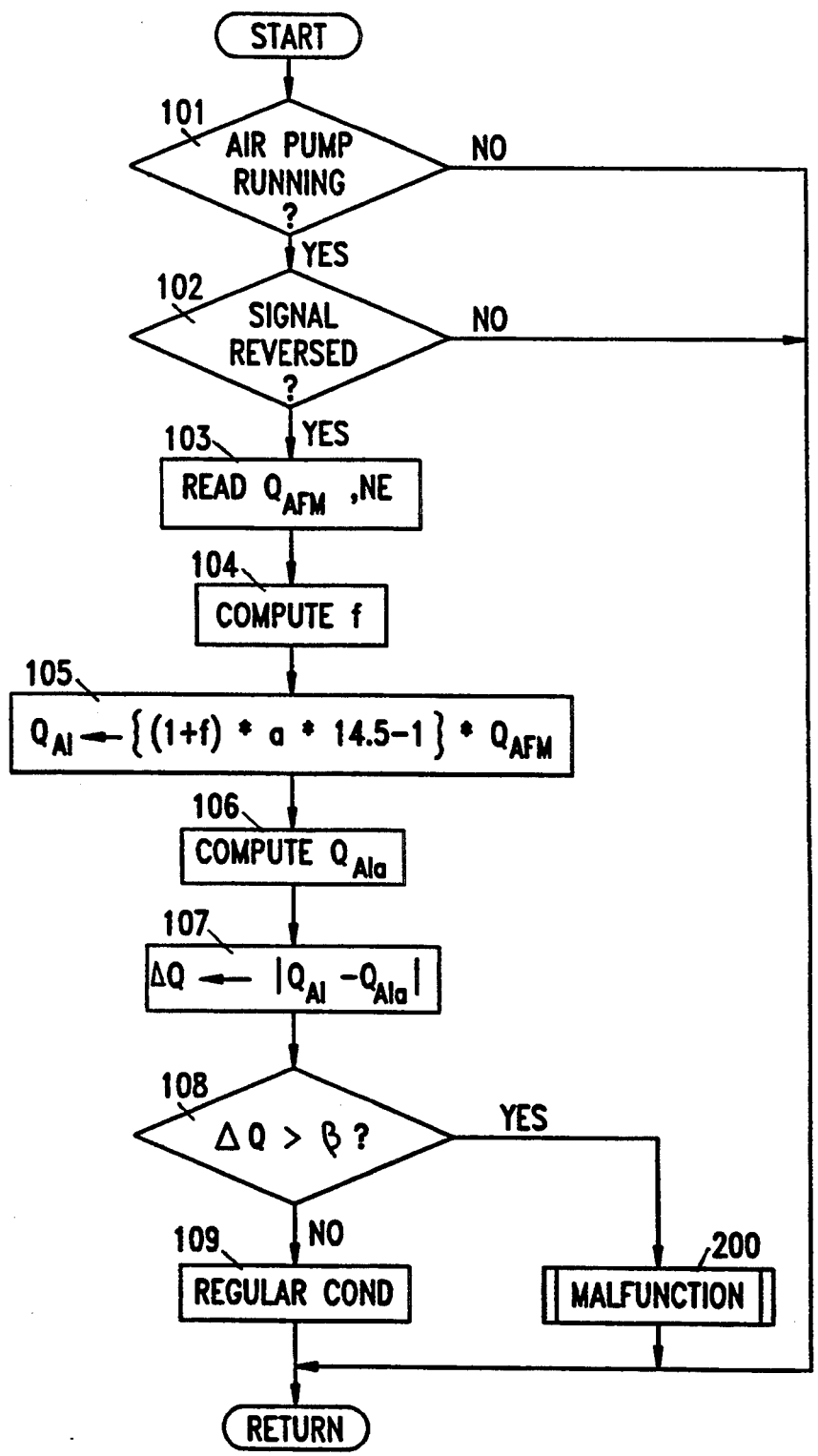
FIG. 2 is a flowchart for the irregular condition diagnostic routine which is carried out by a CPU.

FIG. 2 shows a flowchart for detecting irregular conditions in the secondary air supply mechanism 25, which is one of the operations carried out by the CPU 48, and which is carried out by preset diagnostic check procedure. The CPU 48 determines whether or not the air pump 27 is under the operating condition, i.e., whether or not a drive signal is output to drive the air pump 27 (step 101). If the CPU 48 determines that the drive signal is output, then the CPU 48 determines whether or not the output voltage V from the oxygen sensor 46 is reversing i.e., switching from the enriched condition to the lean condition, or from the lean condition to the enriched condition (step 102). If the output voltage V is reversing, the CPU 48 determines that the air-fuel ratio at that time is in the vicinity of the theoretical air-fuel ratio through the control of the feedback loop, and then advances to step 103.

The CPU 48 now reads the intake air volume $Q_{AFM}$ and engine speed NE, respectively (step 104). These values must be within the range where the air-fuel ratio is in the vicinity of the theoretical air-fuel ratio.

The CPU 48 next computes a correction coefficient f according to the running condition of the engine 1 (step 104). During this computation, the THW, NE, $Q_{AMF}$, THA, TA and oxygen concentration, etc. are utilized.

The CPU 48 computes a secondary air supply volume $Q_{AI}$ through the following equation (2) in which the $Q_{AFM}$ measured at step 103 and the correction coefficient f computed at step 104 are utilized (step 105).

$$Q_{AI} = \{(1+f) \times \alpha \times 14.5 - 1\} \times Q_{AFM} \qquad (2)$$

where 14.5 in equation (2) is the theoretical air-fuel ratio and $\alpha$ is a constant value. The equation (2) is formed by simplifying the following equation (3).

$$A/F = (Q_{AFM} + Q_{AI})/\{(1+f) \times Q_{AFM} \times \alpha\} \qquad (3)$$

where the numerator at the right side indicates the total amount of the air supplied to the engine 1. That is, the cumulative total amount of the air supplied to the combustion chambers 8 through the intake passage 9 and the amount of the air supplied from the air pump 27 to discharge manifolds 23. The denominator at the right side of the equation is the final injection volume which is required for the air-fuel ratio to be converged to the theoretical air-fuel ratio (=14.5) when the above-described cumulative total amount of air is supplied.

Figure 4:
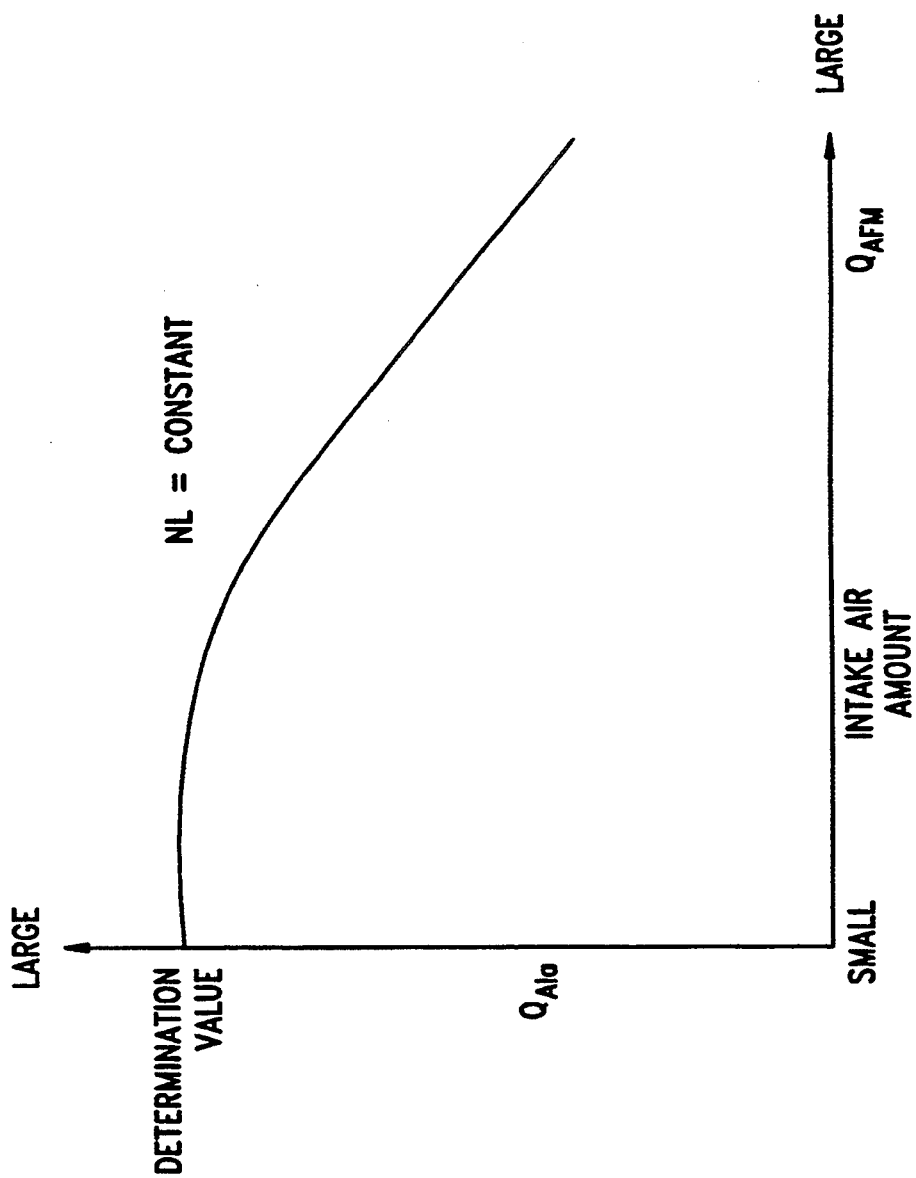
FIG. 4 is a graph showing the linear correlation map between a Determination Value and the secondary air supply amount corresponding to an engine speed.

The CPU 48 computes a Determination Value $Q_{AIa}$ for determining an irregular condition of the secondary air supply mechanism 25 according to the representative map in FIG. 4 (step 106). A transversal axis of this map represents the intake air amount $Q_{AFM}$, and a ordinate axis thereof represents the amount of the secondary air $Q_{AI}$ supplied from the secondary air supply mechanism 25 against the exhaust pressure in the exhaust discharge passage 10 when the mechanism 25 is properly operating. This map is set at every engine speed NE.

More specifically, the map is set upon a following point of view. When the NE is set as a constant speed, the exhaust pressure in the exhaust discharge passage 10 increases according to the increase of the intake air amount $Q_{AFM}$ which is equivalent to an engine load. If so, even when the air pump 27 is properly operating, the secondary air discharged from the air pump 27 becomes slightly difficult to be input to the exhaust discharge manifolds 23, such that the secondary air supply volume $Q_{AI}$ accordingly decreases. Therefore, when the irregular condition of the secondary air supply mechanism 25 is to be determined, the change in the $Q_{AFM}$ relative to the exhaust pressure should be considered. In this map, the Determination Value $Q_{Aia}$ for the $Q_{AI}$ being decreased along the increase of the $Q_{AFM}$ is set at every engine speed NE.

The CPU 48 computes a secondary air supply volume $Q_{AI}$ corresponding to the current NE and the $Q_{AFM}$ with reference to the above-described map at step 106. The CPU 48 sets the computed Determination Value as the $Q_{Aia}$ for diagnosing an irregular condition. Accordingly, the sully volume $Q_{AI}$ of the secondary air which is set by the exhaust pressure in the exhaust discharge manifold 23.

The CPU 48 then advances to step 107, and computes the absolute value of difference between the actual supply volume $Q_{AI}$ at step 105 and the Determination Value $Q_{Aia}$ at step 106 as a Deviation Value $\Delta Q$. This Deviation Value $\Delta Q$ is a parameter for indicating the magnitude of an irregular condition in the secondary air supply mechanism 25.

The CPU 48 determines whether or not the Deviation Value $\Delta Q$ is greater than the Allowable Value $\beta$ (step 109). This Allowable Valve $\beta$ is the maximum value the Deviation Value $\Delta Q$ can approach when the supply mechanism 25 is properly operating. The Deviation Value $\Delta Q$ is set so as to accommodate normal determination error such as for example instrument error by each of the sensors.

If the Deviation Value $\Delta Q$ is smaller than the Allowable Value $\beta$ (i.e., $\Delta Q \leq \beta$), the CPU 48 determines that the supply mechanism 25 is operating normally (step 109). If the Deviation. Value $\Delta Q$ is greater than the Allowable value $\beta$ (i.e., $\Delta Q > \beta$), the CPU determines that the secondary air supply mechanism 25 is defective, i.e., improperly operating. Then, the CPU 48 carries out an irregular condition determination operation (step 200). After the CPU 48 carried out the alternative operations of step 109 or 200, then the CPU 48 terminates this routine.

If the air pump 27 is not operating at step 101, and the output voltage V sent from the oxygen sensor 46 is not reversed at step 102, the CPU 48 terminates this routing without carrying out the operations of steps 103 through 109, and proceeds directly to step 200.

The routine for determining the irregular condition will now be described with reference to FIG. 3. In this routine, two threshold values a and b are set for diagnosing the cause of the irregular conditions in the secondary air supply mechanism 25. Both a, b and the Allowable Value $\beta$ have the following correlation: $\beta < a < b$.

The irregular conditions in the secondary supply mechanism 25 may be generated by various causes. For example, a breakdown of the air pump 27 itself, a malfunction of the controller for the air pump 27, a breakdown of the ASV 29 itself, a malfunction of the controller for the ASV 29, clogging in the supply passage 28 and a leakage in the discharge passage 10 can be considered as the causes.

The following correlation can exist between the above-described causes and the magnitude of the irregular condition in the secondary air supply mechanism 25 (i.e., Deviation Value $\Delta Q$): Through experimental analysis, if at least one of the following conditions exists; a breakdown of the air pump 27 itself, a malfunction of the controller for the air pump 27, a breakdown of the ASV 29 itself, a malfunction of the controller for the ASV 29, then the Deviation Value $\Delta Q$ becomes smaller than or equal to the threshold value a. If a leakage occurs in the discharge passage 10, the Deviation Value $\Delta Q$ becomes greater than or equal to the threshold value b. If foreign matter clogs the supply passage 28, the Deviation Value $\Delta Q$ takes a value between the thresholds values a and b.

Figure 3:
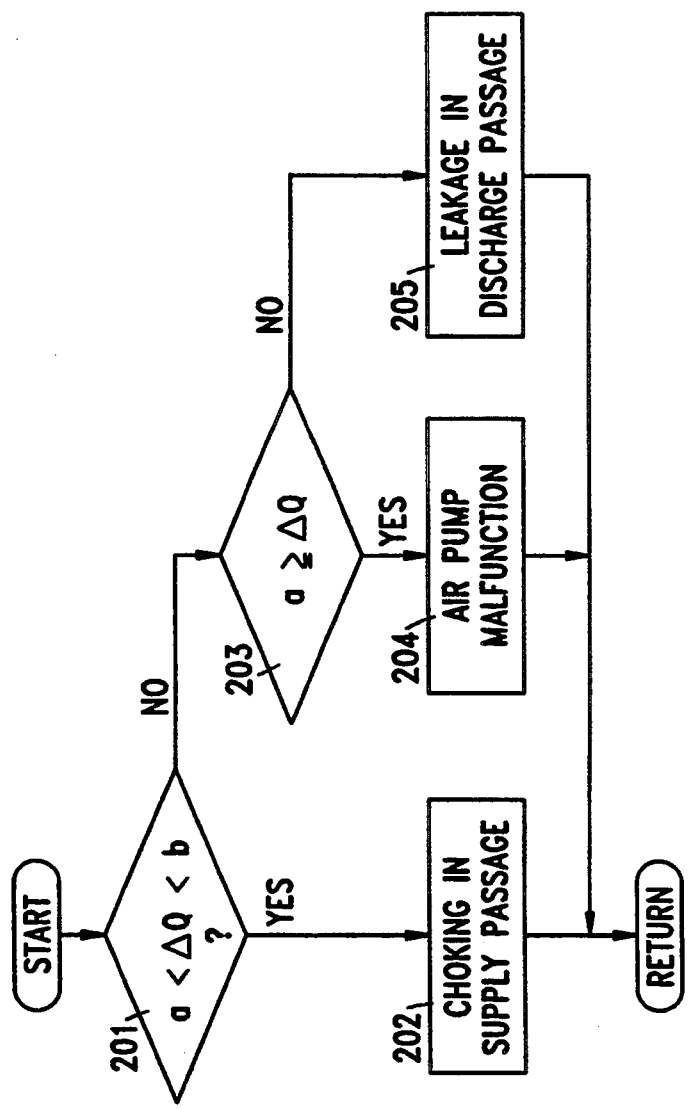
FIG. 3 is a flowchart for detecting an irregular section which is carried out by the CPU.

The irregular condition diagnose routine is shown in FIG. 3. The CPU 48 first comparers the Deviation Value $\Delta Q$ with the thresholds values a, b, and then concludes the cause of the irregular condition in the secondary air supply mechanism 25 as follow: The CPU 48 determines whether or not the Deviation Value $\Delta Q$ is in the region between the threshold values a, b (step 201). If the Deviation Value $\Delta Q$ is in the region ($a < \Delta Q < b$), the CPU 48 diagnoses that the supply passage 28 is closed, i.e., by foreign matter is the cause of the irregular condition in the secondary air supply mechanism 25, and sets a malfunction code corresponding to the diagnosed cause (step 202).

If the Deviation Value $\Delta Q$ is not in the region at step 201, the CPU 48 determines whether or not the Deviation Value $\Delta Q$ is smaller than or equal to the threshold value a (step 203). If the Deviation Value $\Delta Q$ is smaller than or equal to the threshold value a (i.e., $a \geq \Delta Q$), the cPU 48 diagnoses that one of the following conditions exist: the air pump 27 itself has broken, a malfunction of the controller for the air pump 27, the ASV 29 itself has broken, a malfunction of the controller for the ASV 29; and is the cause of the irregular condition in the secondary air supply mechanism 25, and sets a malfunction code corresponding to the diagnosed cause (step 204).

On the other hand, if the Deviation Value $\Delta Q$ is greater than the threshold valve a, the CPU 48 diagnoses that a leakage in the exhaust discharge passage 10 is the cause of the irregular condition in the secondary air supply mechanism 25, and sets a malfunction code corresponding to that diagnosed cause (step 205). After the CPU 48 sets the malfunction codes corresponding to the diagnosed cause at each of the steps 202, 204 and 205, the CPU 48 terminates this routine.

The set malfunction code can be displayed at an external diagnostic devise (not shown). The external diagnose device is normally located in an auto repair shop. When the maintenance is to be carried out or the repair work is performed on a vehicle, the external diagnostic device is connected to the vehicle. A workman can be informed of the cause of the irregular condition in the secondary air supply mechanism 25 by seeing the malfunction code or a corresponding indication of the cause, which is displayed on the external diagnose device.

According to the teaching of the invention, both the cause and the magnitude of an irregular condition in the secondary air supply can be understood through the amount of the Deviation Value $\Delta Q$. The cause of the irregular condition can be identified among a plurality of the causes according to the Deviation Value $\Delta Q$, where the Deviation Value $\Delta Q$ may vary based on the cause of the irregular conditions. Therefore, when repair work is to be performed on the secondary air supply mechanism 25, the time responded to diagnose the cause can be reduced or eliminated. Accordingly, the repair time will be reduced.

Another measure for grasping the magnitude of the irregular condition in the secondary air supply mechanism 25 is utilizing a linear type oxygen sensor which detects the air-fuel ration from the oxygen condensed in the exhaust gas in place of the oxygen sensor 46 in this embodiment. However, in this case, when the feedback control for the air-fuel ratio is to be carried out, the disposed oxygen sensor and the stored control programs should be altered on the contrary, in this embodiment, the irregular condition can be precisely detected by the disposed oxygen sensor 46, and the magnitude of the irregular condition can be grasped.

For detecting the irregular condition in the supply mechanism beside this embodiment, the operation of the secondary air supply mechanism 25 is temporarily suspended. Further, it can be done by temporarily suspending the operation of the feedback control for the air-fuel ratio and simultaneously operating the secondary air supply mechanism 25 to forcibly supply the secondary air. However, if these measures were carried out, the characteristic of the exhaust gas may become poor. On the contrary, in the present invention, the diagnoses is carried out only when the secondary air supply mechanism 25 is operating.

Although only one embodiment of the present invention has been described herein, it should be apparent to those skilled in the art that the present invention may be embodied in many other specific forms without departing from the spirit or scope of the invention. By way of example, without limitation, the following modes are embodied:

(1) The present invention has been described by reference to a secondary air supply mechanism 25, i.e., an air injection type (AI), which supplies the secondary air by means of the air pump 27. Instead of this type, the present invention can be embodied in an air suction type supply mechanism, which directly sucks the air from the intake passage 9 by the action of the exhaust pulsations in the discharge passage 10.

(2) The present invention is embodied in the V type engine 1. It can be embodied in a straight type engine or any other internal combustion engine.

Therefore, the present examples and embodiments are to be considered as illustrative and not restrictive and the invention is not to be limited to the details giving herein, but may modified within the scope of the appended claims.

What is claimed is:

1. A diagnostic apparatus for use in an exhaust system of an internal combustion engine, the exhaust system having an exhaust gas passage, a catalyst for purifying the exhaust gas in the exhaust gas passage and an oxygen sensor for detecting an air-fuel ratio in a combustion chamber, wherein a fuel injection volume is controlled for equalizing a primary air-fuel ratio with a predetermined theoretical air-fuel ratio when the engine is operated under normal conditions, and wherein secondary air is supplied to the exhaust gas passage from a secondary air supply mechanism for forcibly adjusting the air-fuel ratio when the engine is operating under extreme conditions, wherein the secondary supply mechanism is composed of a plurality of members, said apparatus comprising:

means for computing an actual volume flow rate of the secondary air supplied to the exhaust gas passage from the secondary air supply mechanism;

means for storing data indicative of the malfunctioning of the secondary air supply mechanism members corresponding to the computed volume flow rate supplied to the exhaust gas passage;

means for determining which member of the secondary air supply mechanism is malfunctioning based on the value detected by the oxygen sensor and the stored data.

2. An apparatus as set forth in claim 1, wherein said secondary air supply mechanism includes:

an air pump;

a secondary air passage communicating the air pump with the exhaust gas passage; and an air switching valve for opening or closing the secondary air passage.

3. An apparatus as set forth in claim 2 further including a second storing means for storing a standard secondary air supply value for predetermined engine rotation speed of the secondary air supplied to the exhaust gas passage from the secondary air supply mechanism;

4. An apparatus as set forth in claim 3, wherein the actual volume of the secondary air supplied to the exhaust gas passage is determined from a volume of air sucked into the combustion chamber, said volume of air sucked into the combustion chamber being rectified by coefficients relating to engine operation conditions and stoichiometric air-fuel ratio.

5. An apparatus as set forth in claim 4, wherein said oxygen sensor detects rich/lean state of the air-fuel ratio and volume of the secondary air is computed when the oxygen sensor detects an inversion of said rich/lean state.

6. An apparatus as set forth in claim 4, wherein said determining means determines the malfunctioning member according to a remainder value of subtraction with the actual secondary air supply value and the standard secondary air supply value.

7. An apparatus as set forth in claim 6, wherein said computing means, said first and second storing means and said determining means are a microprocessor controller.

8. An apparatus as set forth in claim 7, wherein said engine operation conditions include the temperature of air flowing through an intake passage, a temperature of engine coolant and the engine rotation speeds detected by sensors, respectively.

9. An apparatus as set forth in claim 8, wherein the secondary air supply mechanism further includes a conduit passage for introducing a negative pressure which is in fluid communication with the air switching valve and has an electromagnetic valve controlled by the controller, said electromagnetic valve introducing the negative pressure to the air switching valve for switching the air switching valve from a non-communicating state to a communicating state between the exhaust gas passage and the air pump.

10. An apparatus as set forth in claim 9, wherein said oxygen sensor includes a heater for heating the oxygen sensor when the coolant temperature is lower than a predetermined value.

11. A diagnostic apparatus for use in an exhaust system of an internal combustion engine, the exhaust system having an exhaust gas passage, a catalyst for purifying the exhaust gas in the exhaust gas passage and an oxygen sensor for detecting an air-fuel ratio in a combustion chamber, wherein a fuel injection volume is controlled for optimizing the air-fuel ratio and the catalyst activation when the engine is operated under normal conditions, and wherein secondary air is supplied to the exhaust gas passage from a secondary air supply mechanism for forcibly adjusting the air-fuel ratio when the engine is operating under extreme conditions, wherein the secondary supply mechanism is composed of a plurality of members, said apparatus comprising:

means for computing an actual volume flow rate of the secondary air supplied to the exhaust gas passage by rectifying a volume of air sucked into the combustion chamber with coefficients relating to engine operation conditions and a stoichiometric air-fuel ratio;

air value data storing means for storing a standard secondary air supply value for every engine rotation speed, the standard secondary air supply value corresponding to the secondary air supplied to the exhaust gas passage from the secondary air supply mechanism;

data storing means for storing data indicative of the malfunctioning of the secondary air supply mechanism members corresponding to a difference between the actual secondary air supply value and the standard air supply value;

means for determining which member of the secondary air supply mechanism is malfunctioning based on the value detected by the oxygen sensor and the stored data.

12. An apparatus as set forth in claim 11, wherein said secondary air supply mechanism includes:
an air pump;
a secondary air passage communicating the air pump with the exhaust gas passage; and
an air switching valve for opening or closing the secondary air passage.

13. An apparatus as set forth in claim 11, wherein said computing means, said first and second storing means and said determining means are a controller.

14. An apparatus as set forth in claim 11, wherein said engine operation conditions include a temperature of air flowing through an intake passage, a temperature of engine coolant and the engine rotation velocity detected by sensors, respectively.

15. An apparatus as set forth in claim 13 further including a passage for introducing a negative pressure which is in fluid communication with the air switching valve and has an electromagnetic valve controlled by the controller, said electromagnetic valve introducing the negative pressure to the air switching valve for selectively communicating and discommunicating the exhaust gas passage and the air pump.

16. An apparatus as set forth in claim 11, wherein said oxygen sensor includes a heater for heating the oxygen sensor when the coolant water temperature is lower than a predetermined value.

17. A diagnostic apparatus for use in an exhaust system of an internal combustion engine, the exhaust system having an exhaust gas passage, a catalyst for purifying the exhaust gas in the exhaust gas passage and an oxygen sensor for detecting an air-fuel ratio in a combustion chamber, wherein a-fuel injection volume is controlled for optimizing the air-fuel ratio and the catalyst activation when the engine is operated under normal conditions, and wherein secondary air is supplied to the exhaust gas passage from a secondary air supply mechanism for forcibly adjusting the air-fuel ratio when the engine is operating under extreme conditions, wherein the secondary supply mechanism is composed of a plurality of members, said apparatus comprising:

a plurality of sensors for sensing engine operation conditions, said engine conditions including at least a temperature of air flowing in an intake passage, a temperature of engine coolant and the engine rotation velocity;

an air flow meter for detecting a volume of air sucked into the combustion chamber;

a data memory for storing a standard secondary air supply value for every engine rotation velocity;

a controller for computing an actual volume of the secondary air supplied to the exhaust gas passage by rectifying a volume of air sucked into the combustion chamber with coefficients relating to engine operation conditions and stoichiometric air-fuel ratio, and for determining which of the secondary air supply mechanism members is malfunctioning based on a difference between the actual secondary air supply value and the standard secondary air supply value stored for the detected engine rotation speed.

18. An apparatus as set forth in claim 17, wherein said oxygen sensor detects rich/lean state of the air-fuel ratio and volume of the secondary air is computed when the oxygen sensor detects an inversion of said rich/lean state.

19. An apparatus as set forth in claim 17, wherein said secondary air supply mechanism includes:
an air pump;
a secondary air passage communicating the air pump with the exhaust gas passage; and
an air switching valve for opening or closing the secondary air passage.

20. An apparatus as set forth in claim 17 further including a fluid passage for introducing a negative pressure into fluid communication with the air switching valve and has an electromagnetic valve controlled by the controller, said electromagnetic valve introducing the negative pressure to the air switching valve for selectively connecting and disconnecting communication of the exhaust gas passage and the air pump.

21. An apparatus as set forth in claim 17, wherein said oxygen sensor includes a heater for heating the oxygen sensor when the coolant temperature is lower than a predetermined value.

* * * * *